(No Model.)  2 Sheets—Sheet 1.
R. HAHNEL.
POWER TRANSMITTER.

No. 494,331. Patented Mar. 28, 1893.

WITNESSES
Carroll J. Webster
Sherman W. Lott

INVENTOR
Robert Hahnel
By William Webster
Atty (No Model.) 2 Sheets—Sheet 2.

R. HAHNEL.
POWER TRANSMITTER.

No. 494,331. Patented Mar. 28, 1893.

WITNESSES
Carroll J. Webster
Sherman W. Lott

INVENTOR
Robert Hahnel
By William Webster
Atty

UNITED STATES PATENT OFFICE.

ROBERT HAHNEL, OF TOLEDO, OHIO.

POWER-TRANSMITTER.

SPECIFICATION forming part of Letters Patent No. 494,331, dated March 28, 1893.

Application filed October 6, 1892. Serial No. 448,081. (No model.)

*To all whom it may concern:*

Be it known that I, ROBERT HAHNEL, of Toledo, county of Lucas, and State of Ohio, have invented certain new and useful Improvements in Power-Transmitters; and I do hereby declare that the following is a full, clear, and exact description of the invention, which will enable others skilled in the art to which it appertains to make and use the same, reference being had to the accompanying drawings, and to figures of reference marked thereon, which form part of this specification.

My invention relates to a power transmitter, and has for its object to provide convenient means for receiving power from a main driving shaft and transmitting the same to any desired mechanism, and an automatic brake mechanism whereby the rotation of the transmitter due to, the momentum attained is speedily checked when power is removed.

With these objects in view the invention consists in a power shaft, a friction drive thereon, a friction wheel upon a movable shaft at a right angle to the first named shaft, a stationary brake surface and a rock lever for moving the friction wheel to the drive wheel or forcing the friction wheel to the brake.

Figure 1:
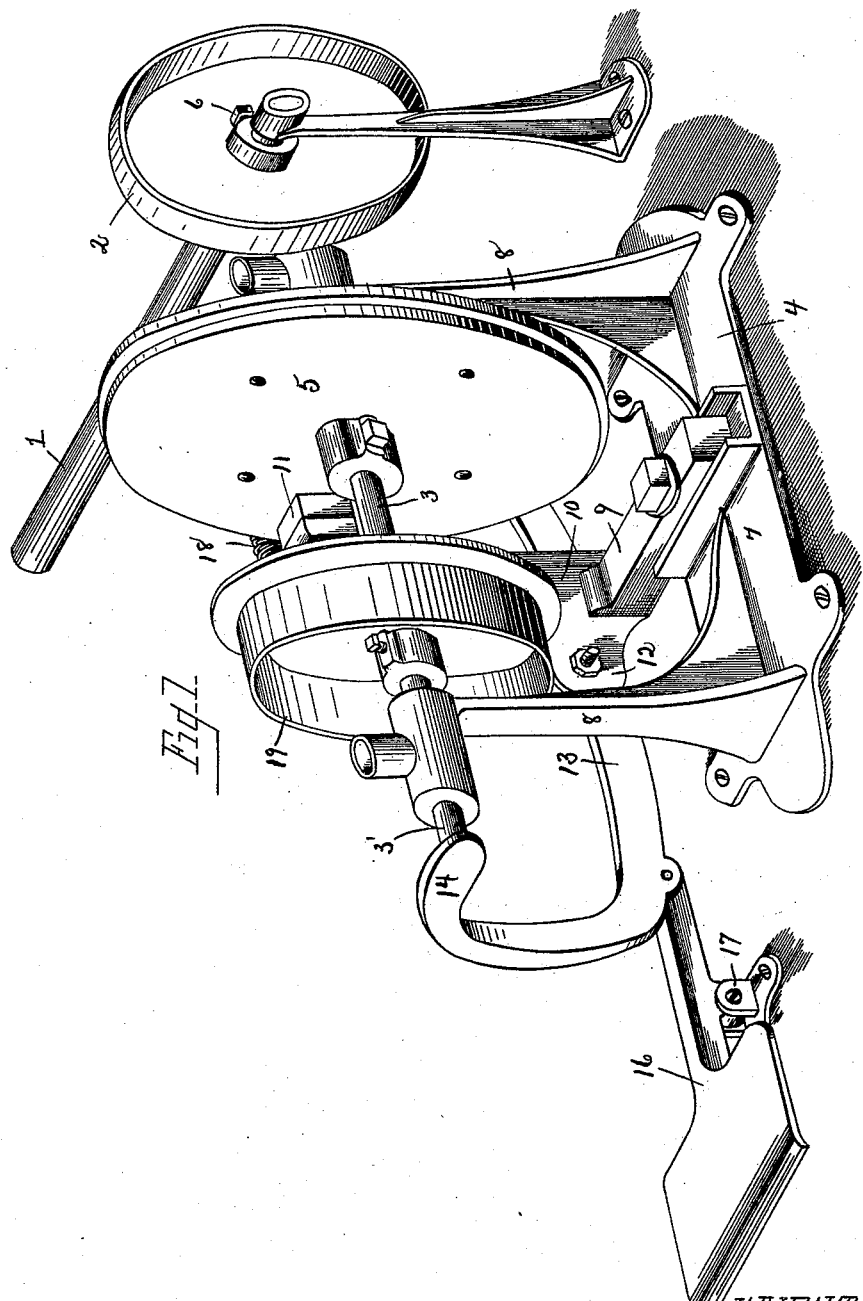
Figure 2:
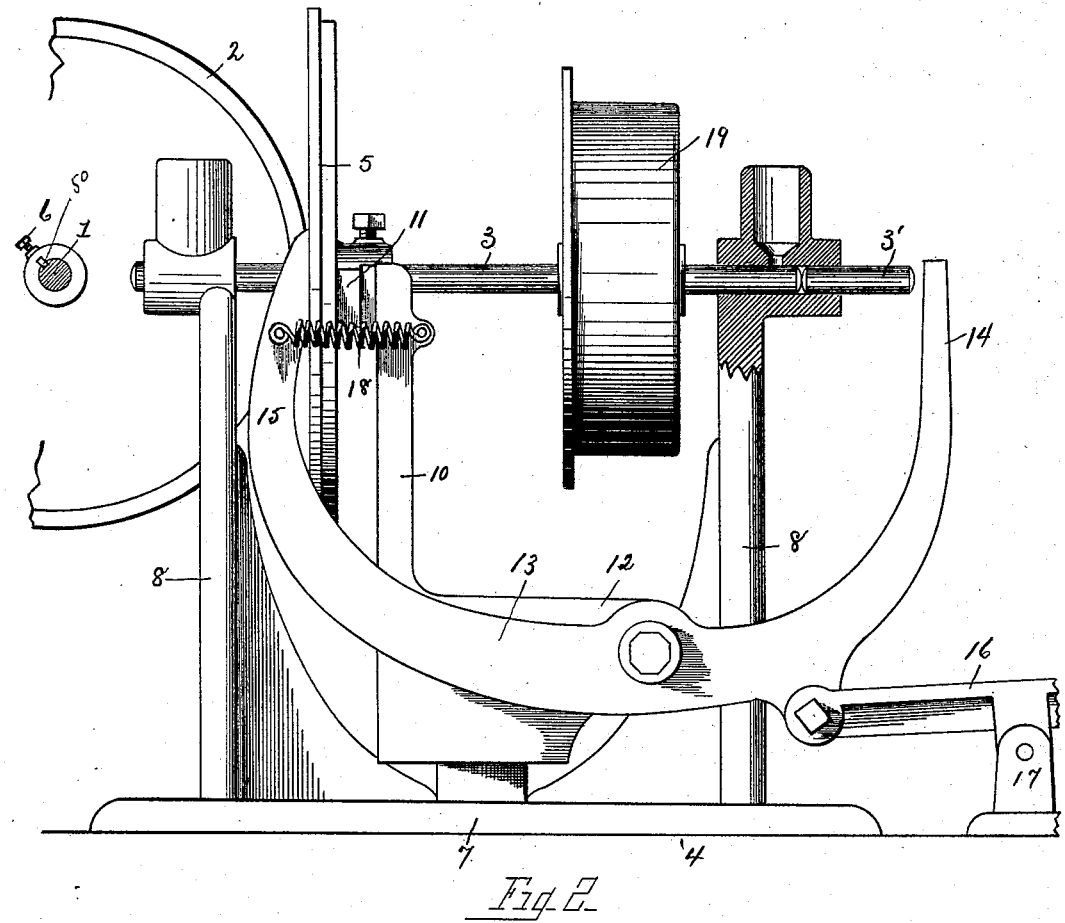

In the drawings: Figure 1 is an elevation of a complete apparatus. Fig. 2 is a side elevation.

1 designates the main power shaft, upon which are mounted one or more friction drive wheels 2, which are preferably movable longitudinally upon the shaft in order to increase or diminish the speed of the driven wheel as will be more fully explained.

3 designates a shaft journaled in a frame 4, at a right angle to shaft 1 and movable in its bearings to or from the driving shaft, there being a friction wheel 5 upon the shaft 3, the face of which is adapted to be brought in contact with the periphery of wheel 2 when the shaft 3 is moved toward shaft 1, and to receive motion from the drive wheel, the speed of the driven wheel being regulated by the position of the driver 2 upon the shaft 1, as the nearer the driver is to the axis of the driven wheel in its frictional contact the greater will be the speed of the driven wheel. I have therefore secured wheel 2 from revolution on the shaft 1 by means of a spline 50 which permits longitudinal movement upon the same, and I secure the wheel in longitudinal adjustment by means of a set screw 6. Frame 4 comprises the base plate 7 and vertical standards 8 in which are journals for shaft 3. Upon the upper side of the base plate is secured an arm 9 having a standard 10 extending vertically at right angles and provided with a friction brake surface 11, against which wheel 5 may be forced by the movement in one direction of shaft 3. Upon the outer end of arm 9 there is formed a plate 12 upon which is pivotally secured a substantially U-shaped rock lever 13, the vertical arms 14 and 15 respectively of which extend to a plane parallel with the axis of wheel 5 one arm 14 contacting with a section 3' of shaft 3 to move the shaft longitudinally to cause wheel 5 to be in frictional contact with the drive wheel, and the opposite arm being adapted to be brought in contact with the face of wheel 5 to force the wheel against the brake surface to stop the revolution thereof when removed from contact with the driver. Rock lever 13 is moved to force shaft 3 toward shaft 1 by means of a foot lever 16 connected with the rock lever in front of its pivoted connection with the frame and fulcrumed in a standard 17 secured to the floor, whereby when lever 16 is depressed lever 13 is rocked upon the pivot and arm 14 is forced against the end of the shaft and moves the same longitudinally. Arm 15 is urged in an opposite direction to force wheel 5 against the brake by means of a spiral spring 18 connected with the brake standard and arm 10.

19 designates a pulley mounted upon shaft 3, from which pulley power is transmitted by belt to any desired mechanism.

In practice I may employ a shaft of considerable length, and transmit power to a plurality of sewing machines by means of a number of transmitters connected with the said shaft, and each transmitter operating its respective machine.

What I claim is—

1. In a power transmitter, the combination with a main shaft, of a friction driver fixed thereon, a shaft mounted at an angle to the first named shaft, and so as to be longitudinally movable, a friction driver thereon, a frame provided with a brake surface, a rock lever pivoted to the frame and having arms adapted to contact, respectively, with the end of the movable shaft and with the friction driver thereon.

2. In a power transmitter, the combination, with a main drive shaft, of a friction driver fixed thereon, a shaft mounted at right angles to the first named shaft, and longitudinally movable in its bearings, a driver mounted thereon, a frame, a brake surface formed thereon, a U-shaped rock lever pivoted to the frame, the vertical arms of which rock lever are adapted to contact, respectively, with the end of the movable shaft and with the drive wheel thereon.

3. In a power transmitter, the combination with a friction drive wheel, of a shaft arranged at right angles to the axis of said wheel, and longitudinally movable, a friction wheel mounted on the shaft, a frame having a brake surface, a rock lever having vertical arms, a foot lever for operating the rock lever in one direction, and a spring for reversing the motion.

In testimony that I claim the foregoing as my own I hereby affix my signature in presence of two witnesses.

ROBERT HAHNEL.

Witnesses:
WILLIAM WEBSTER,
CARROLL J. WEBSTER.